Figure 1:
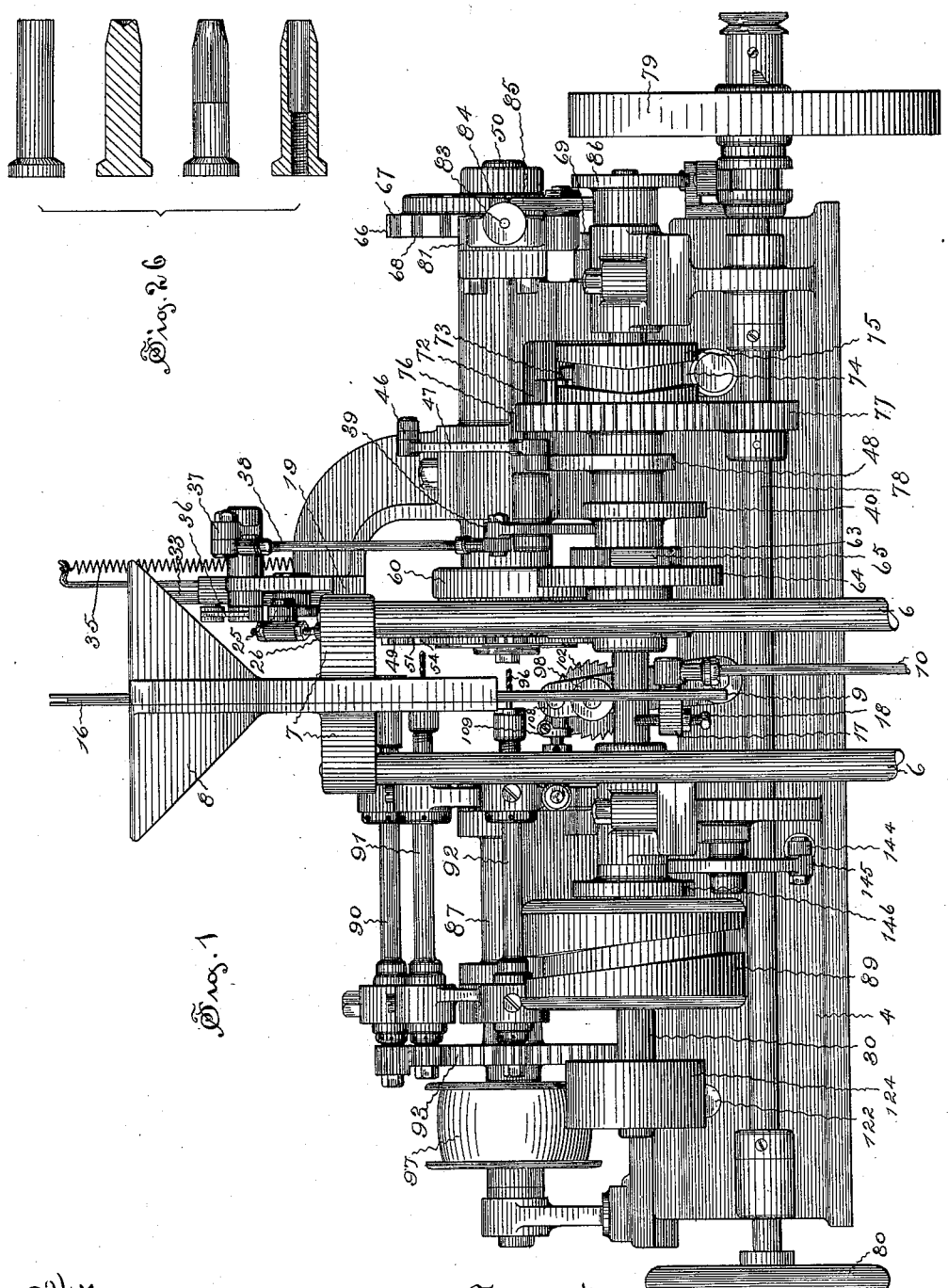

(No Model.) 9 Sheets—Sheet 1.
A. C. CAMPBELL.
MACHINE FOR FORMING NIPPLES.
No. 594,457. Patented Nov. 30, 1897.

Witnesses:
E. W. Fothergill
E. J. Hyde.

Inventor,
Andrew C. Campbell, by
Harry P. Williams, atty.

(No Model.) 9 Sheets—Sheet 3.

A. C. CAMPBELL.
MACHINE FOR FORMING NIPPLES.

No. 594,457. Patented Nov. 30, 1897.

Witnesses:
E. W. Fothergill
E. J. Hyde

Inventor,
Andrew C. Campbell,
Harry R. Williams,
atty.

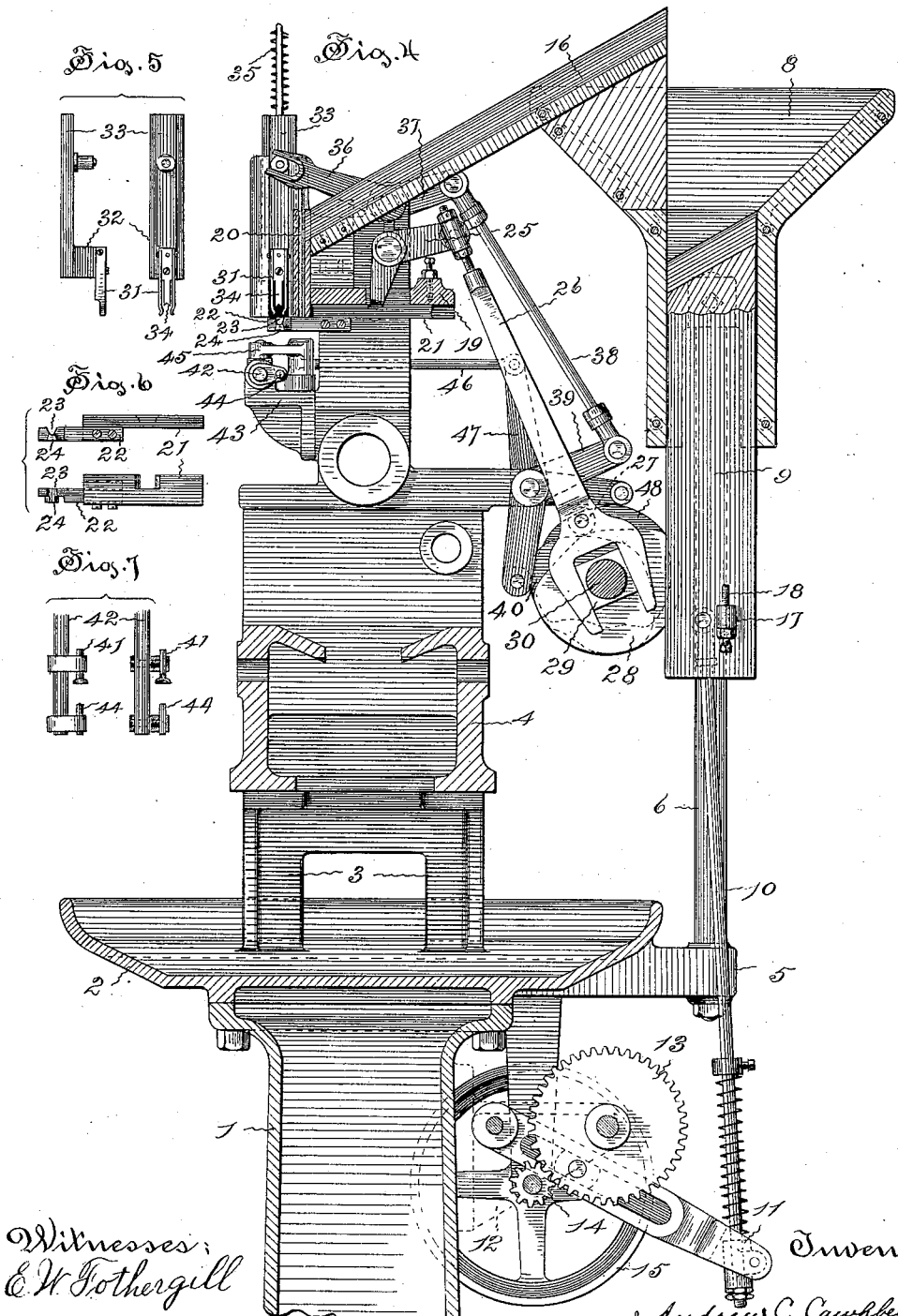

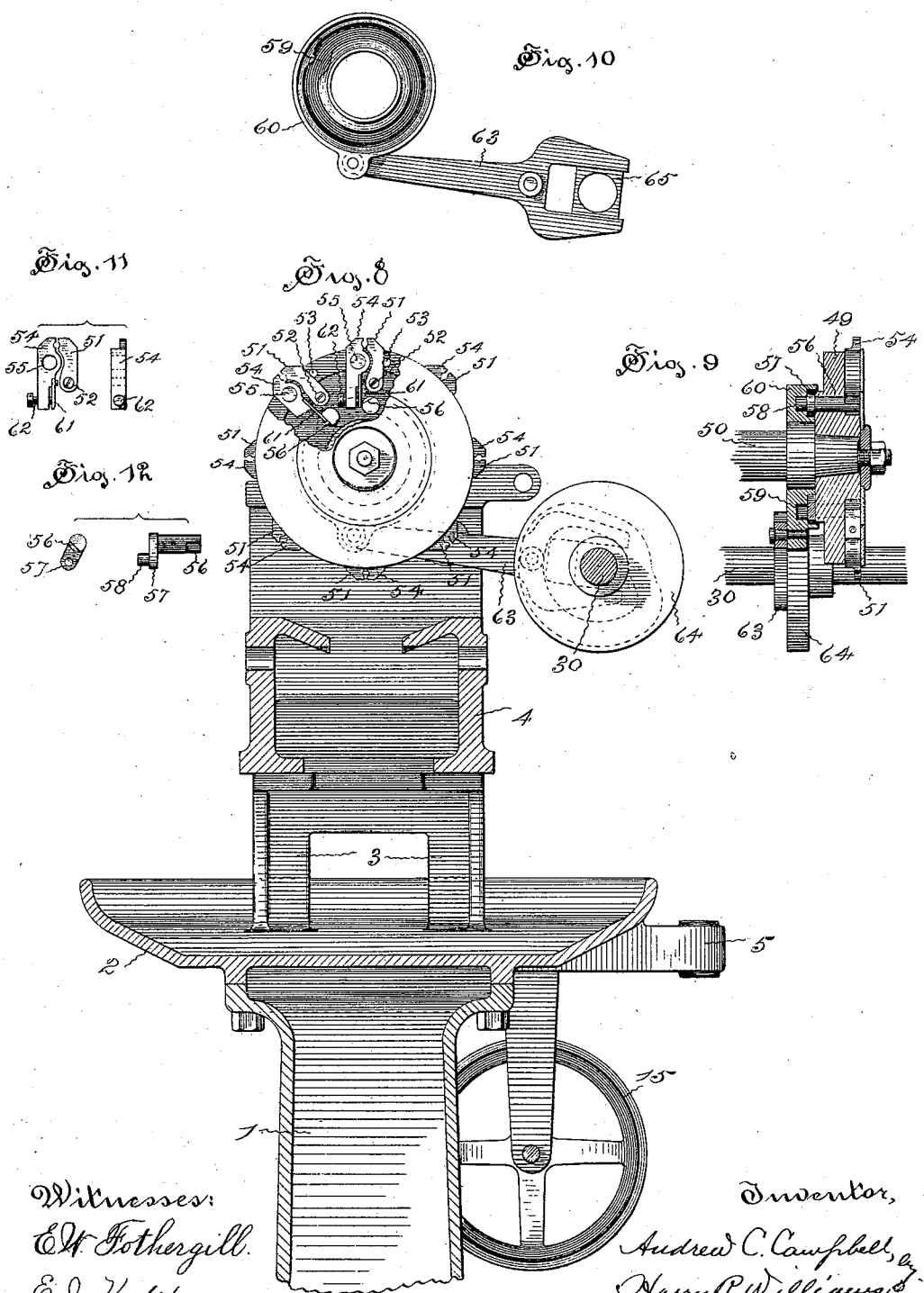

(No Model.) 9 Sheets—Sheet 6.
A. C. CAMPBELL.
MACHINE FOR FORMING NIPPLES.
No. 594,457. Patented Nov. 30, 1897.
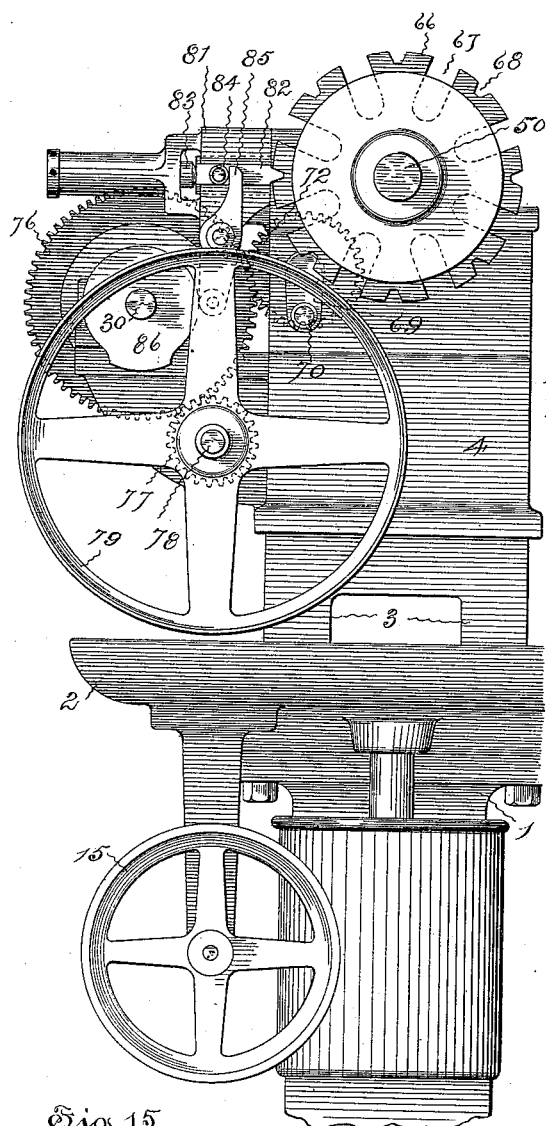
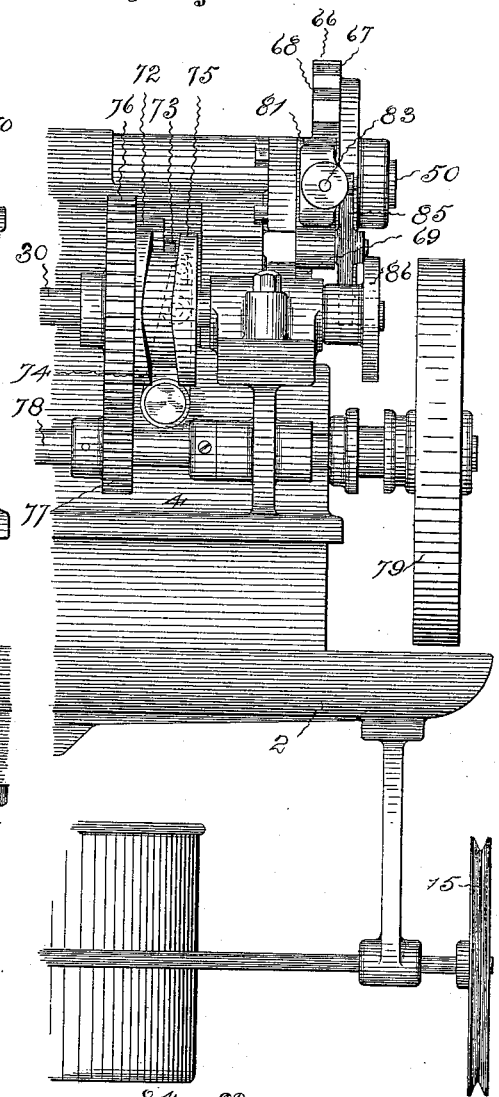
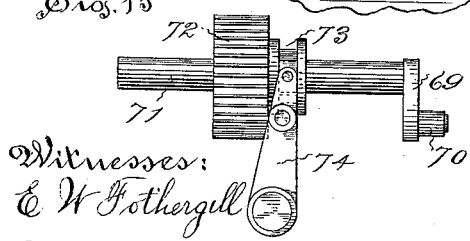
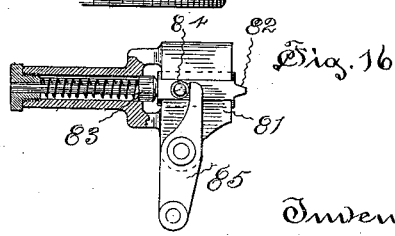
Witnesses:
E. W. Fothergill
E. J. Hyde.
Inventor,
Andrew C. Campbell,
Harry R. Williams
Atty.

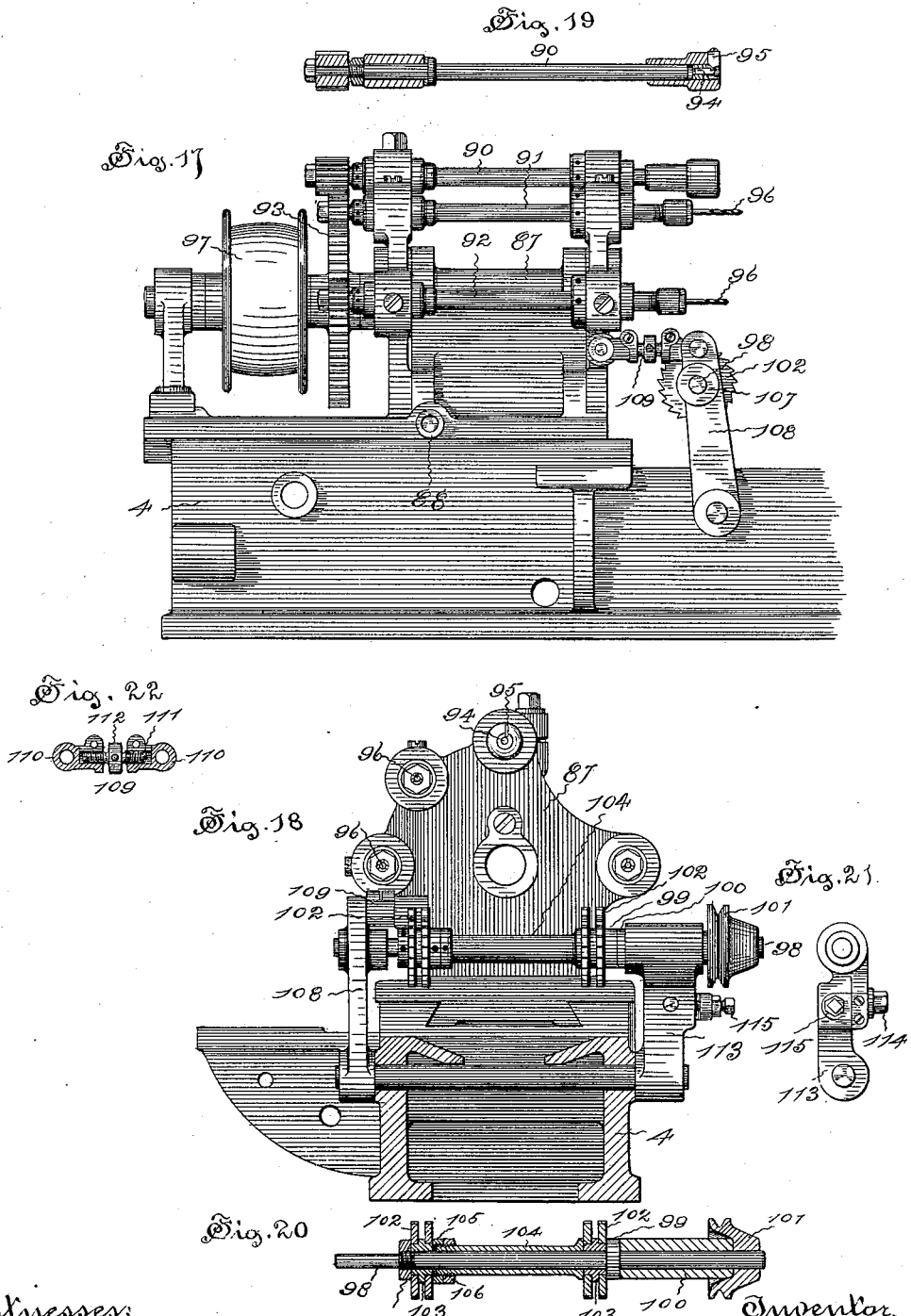

(No Model.)

A. C. CAMPBELL.
MACHINE FOR FORMING NIPPLES.

No. 594,457.

9 Sheets—Sheet 8.

Patented Nov. 30, 1897.

Witnesses:
E. W. Fothergill
E. J. Hyde

Inventor,
Andrew C. Campbell
by Harry P. Williams,
atty.

THE NORRIS PETERS CO., PHOTO-LITHO., WASHINGTON, D. C.

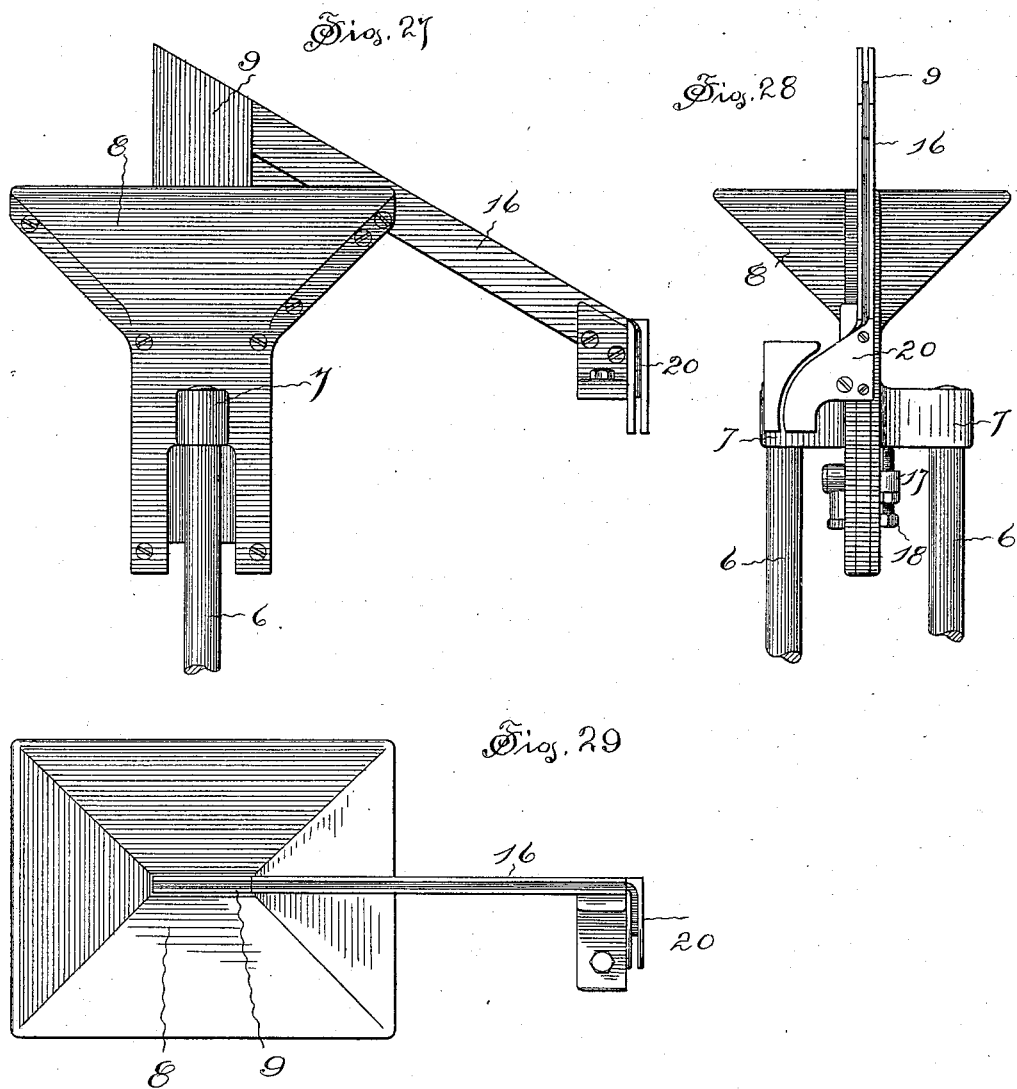

UNITED STATES PATENT OFFICE.

ANDREW C. CAMPBELL, OF WATERBURY, CONNECTICUT, ASSIGNOR TO THE E. J. MANVILLE MACHINE COMPANY, OF SAME PLACE.

MACHINE FOR FORMING NIPPLES.

SPECIFICATION forming part of Letters Patent No. 594,457, dated November 30, 1897.

Application filed May 26, 1897. Serial No. 638,273. (No model.)

*To all whom it may concern:*

Be it known that I, ANDREW C. CAMPBELL, a citizen of the United States, residing at Waterbury, in the county of New Haven and State of Connecticut, have invented certain new and useful Improvements in Machines for Forming Nipples, of which the following is a specification.

The invention relates to those machines which are constructed for forming the nipples employed in the building of wire-spoke wheels for bicycles and similar vehicles.

The object of the invention is to provide a comparatively inexpensive automatic machine of this class which will rapidly and accurately form such nipples continuously without requiring constant or skilled attendance.

In the machine shown as embodying the invention the blanks, which have been given heads of the desired shape and cut to the required lengths, pass from a hopper to a slide, which places them one at a time in position to be grasped by fingers that are so moved as to put the successive blanks into position to be thrust by a pusher into the succeeding sets of opened jaws borne by a carrier. After each set of open jaws receives a blank the jaws are closed by the movement of a small cam, and the carrier, by an index mechanism, is given a rotary movement. By the regular intermittent rotary movements of the carrier each blank gripped by the closed jaws is first carried into position to be operated upon by a tool that moves up and centers and shapes the end, then into position to be operated upon by a drill that bores a longitudinal hole part way through, then into position to be operated upon by another drill that completes the perforation through the blank, then into position to be operated upon by mills or similar tools which slab off opposite sides of the blank, then, after an interval, into position to be operated upon by another set of mills or similar tools which slab off other opposite sides, then into position to be operated upon by a tap that threads the small perforation, and, finally, into position where the jaws are opened and an ejector moves up and pushes the finished nipple from the jaws. Another blank is inserted into the position from which the finished nipple has been ejected, and the centering, turning, drilling, slabbing, and tapping tools operate simultaneously upon the successive blanks presented in front of them by the intermittent movements of the carrier.

Figure 2:
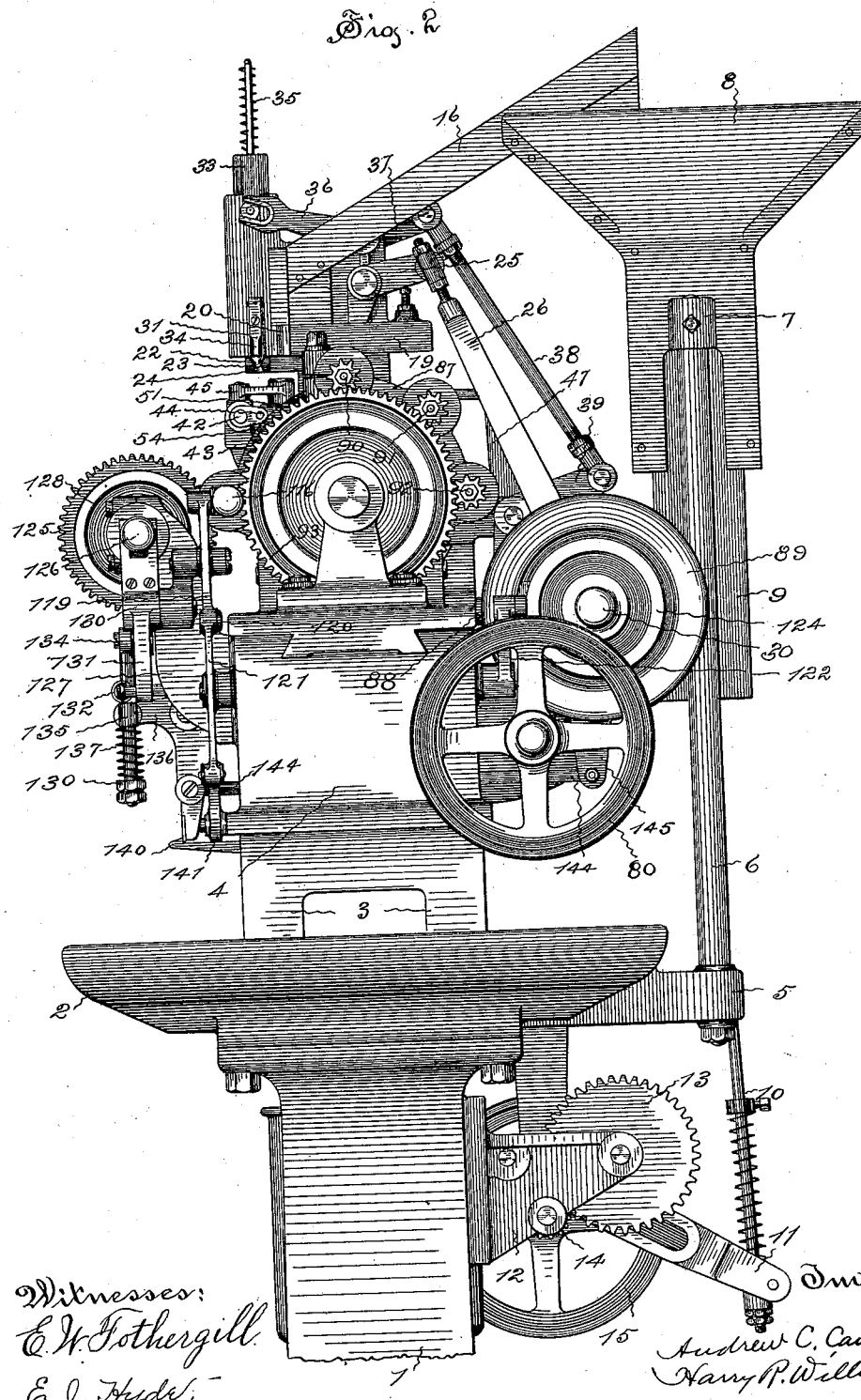
Figure 3:
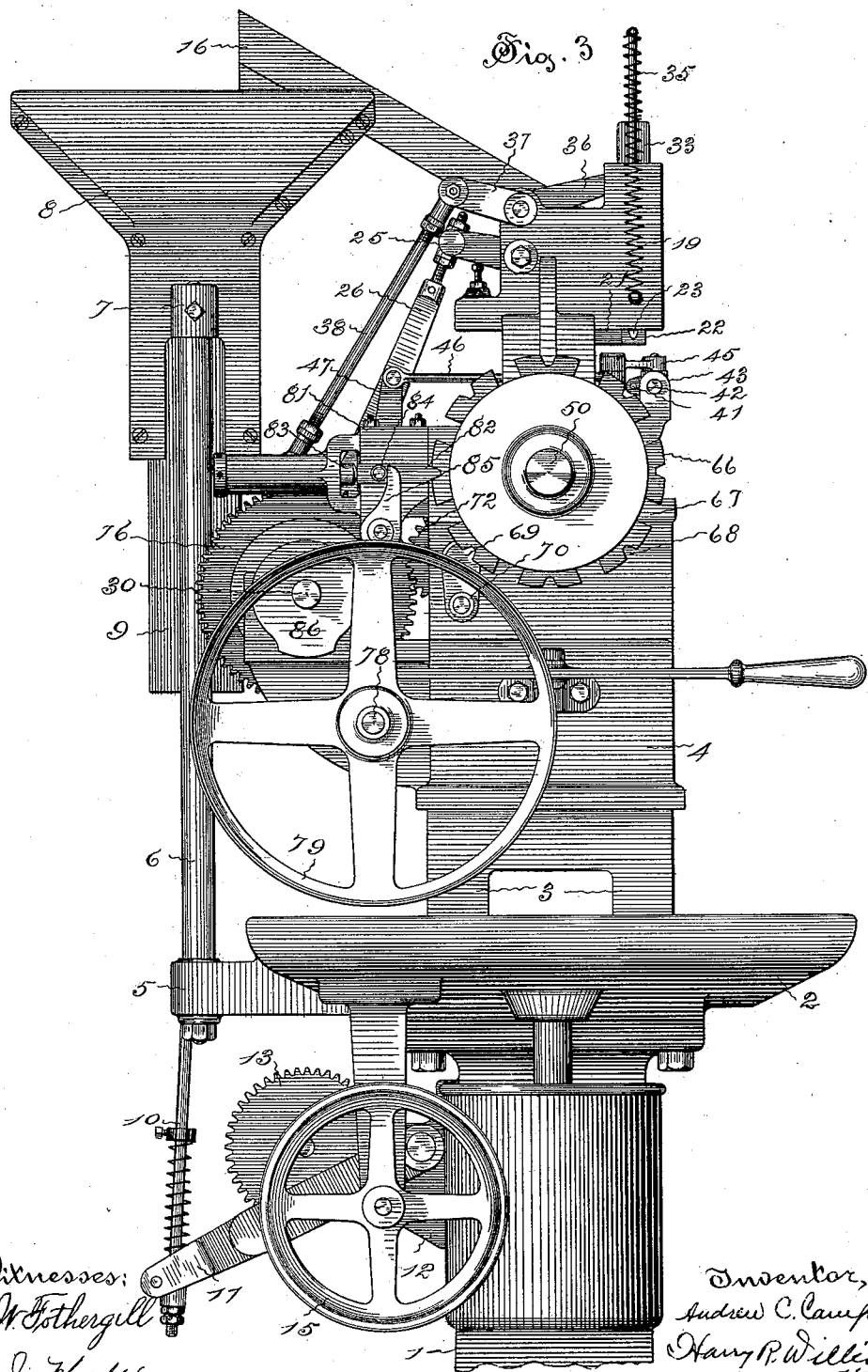
Figure 23:
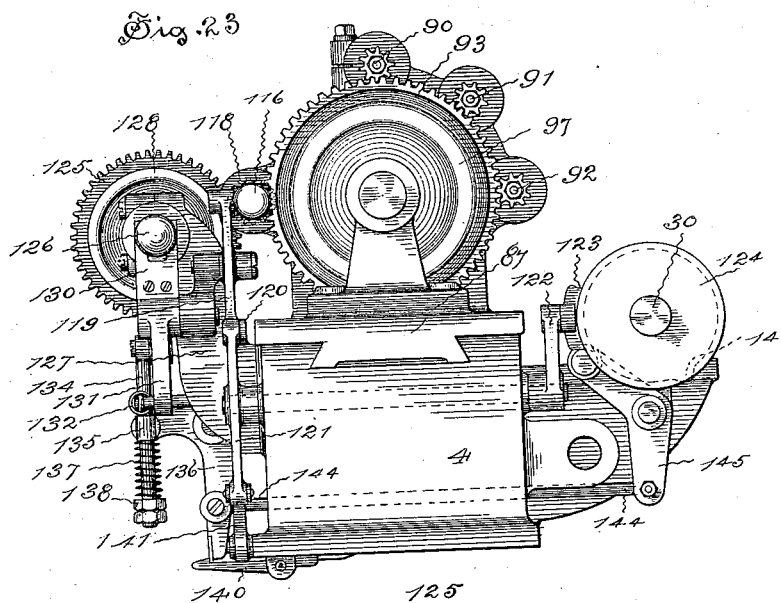
Figure 24:
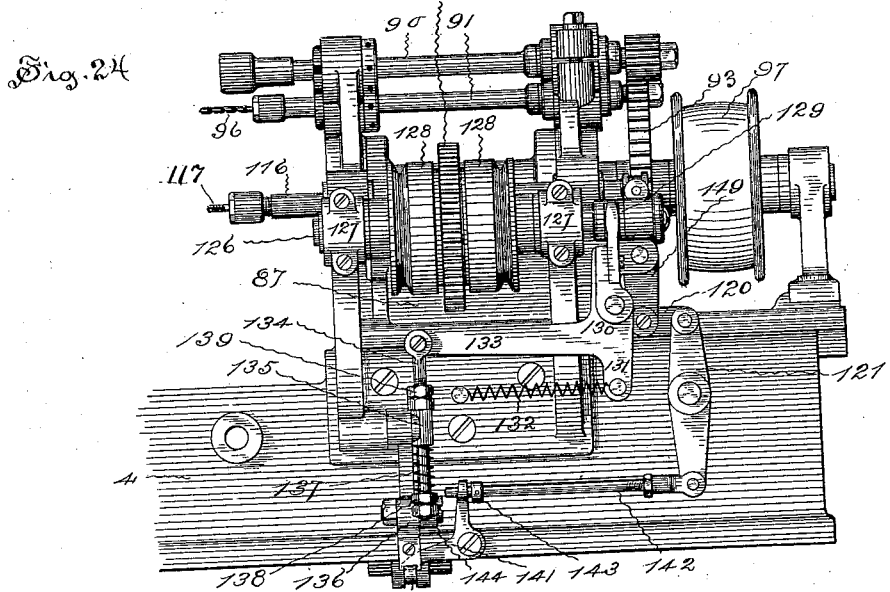
Figure 25:
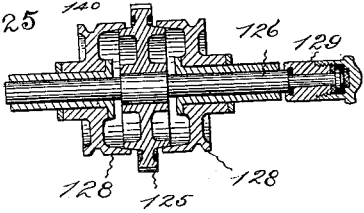

Referring to the accompanying drawings, Figure 1 is a rear elevation of a machine which embodies the invention. Fig. 2 is an elevation of the left-hand end of the machine. Fig. 3 is an elevation of the right-hand end of the machine. Fig. 4 is a vertical transverse section of the machine, taken on such a plane as to show the hopper and the feed mechanisms. Fig. 5 are detail views showing the arrangement of the grasping-fingers. Fig. 6 are detail views showing the arrangement of the slide which presents the blanks to the grasping-fingers. Fig. 7 are detail views showing the arrangement of the pusher and ejector which moves the blanks into and ejects the finished nipples from the jaws of the carrier. Fig. 8 is a vertical transverse section taken on such a plane as to show the construction and arrangement of the carrier, with the holding-jaws and the mechanisms for operating these. Fig. 9 is a vertical section through the center of the carrier with the jaws. Fig. 10 is a view illustrating the jaw opening and closing mechanism. Fig. 11 are detail views showing the jaws. Fig. 12 are detail views showing the jaw-locking cams. Fig. 13 is a view of one end of the machine, showing the mechanism for intermittently rotating the carrier. Fig. 14 is a side view of this same mechanism. Fig. 15 is a detail view of a part of the index-moving mechanism. Fig. 16 is a detail view, with a part in section, showing the locking mechanism, which holds the index in correct position when the carrier should remain stationary. Fig. 17 is a side view of a portion of one end of the machine, showing the centering, turning, drilling, and slabbing mechanisms. Fig. 18 is a transverse section of a portion of the machine, looking toward the centering, turning, drilling and slabbing mechanisms. Fig. 19 is a detail sectional view showing the centering and turning spindle. Fig. 20 is a detail sectional view showing the slabbing-mills and their spindle. Fig. 21 is an edge view of one of the brackets that supports the slabbing-mills. Fig. 22 is a sectional view of the connection used between the slabbing-mill frame and the movable carriage. Fig. 23 is an end view of a portion of the machine, showing the tapping mechanism. Fig. 24 is a side view of one end of the machine, showing the tapping mechanism. Fig. 25 is a sectional view taken through the clutch-shaft of the tapping mechanism. Fig. 26 are detail views which illustrate the results of the operations of this machine. Fig. 27 is a detail side view of the hopper and feed-trough leading therefrom. Fig. 28 is a detail front view of the same. Fig. 29 is a detail plan view of the feed-trough.

A standard 1 of any common form may be employed for supporting the machine. Upon this standard there is a table or pan 2, and supported by this upon suitable legs 3 is a bed 4. Projecting rearwardly from the table or pan are lugs 5, and secured to these are posts 6, which at their upper ends hold lugs 7, that project from the walls of the feed-hopper 8. The feed-hopper is formed of plates screwed together, and its side walls at the top flare outwardly, so that the blanks which are placed therein will gravitate toward the center. Loosely fitting in the lower part of the hopper and having a movement through it is an elevator-plate 9. This elevator has its upper end inclined, and this inclined end is provided with a slot sufficiently wide to receive the shanks, but not the heads of the blanks, so that when there are blanks in the hopper they will tend to slide down the inclined walls toward the center and rest with their heads on the upper inclined end of the elevator and their shanks hanging in the slot in this end of the elevator.

Connected with the elevator, near its lower end, by a suitable joint is a rod 10, which rod at its lower end is connected by a suitable joint with the end of a lever 11, that is pivotally supported by a bracket 12, attached to the standard. This lever is slotted for a portion of its length, and loosely fitting in this slot is a block that is eccentrically connected with the face of a gear 13, that is supported by the bracket 12. Meshing with this gear is a pinion 14, that is mounted upon a shaft that bears a pulley 15. When this pulley is rotated, the pinion rotates the gear, and the block on the face of the gear oscillates the lever, which in turn reciprocates the rod and moves the elevator in the hopper up and down. When the elevator moves up, the blanks which it will receive in its slotted end will be lifted sufficiently high to slide down the inclined end into the trough 16. The rod 10 is adjustably connected with the end of the lever 11, in order that the movement of the elevator may be properly determined. Held by a lug 17, projecting from the elevator-plate, is an adjustable stop-screw 18, that may be set so as to engage at the proper time with the under side of one of the lugs 7, that project from the walls of the hopper, in order that the elevator will surely stop at the end of its upward movement in the correct position, Figs. 1, 2, 3, and 4.

The slot of the elevator in its upper position forms a continuation of the slot of the trough 16, so that the blanks slide from the elevator down into the trough by gravity. The upper end of the trough is connected with the hopper and the lower end of the trough is supported by a block 19, mounted upon the bed. At the lower end the trough terminates in a grooved way 20, that turns at right angles to the plane of the groove of the trough, so that the blanks as they pass down the trough, hanging by their heads, turn around and over and rest horizontally upon the movable slide which forms the bottom of the way. This slide has a dovetailed part 21, that is fitted into a dovetailed guiding-groove in the block 19, and a bar 22, that is adapted to move back and forth beneath the opening at the lower end of the grooved way 20. This bar 22 has a notch 23 of a size that will receive the shank of one of the blanks, and the walls of this bar part of the slide are cut away upon each side of the notch for a portion of its length, leaving a projecting support 24, Figs. 1, 2, 3, and 4.

The dovetailed part of the slide has a mortise, and projecting into this is one end of an angle-lever 25, that is pivoted to the block 19, the other end of the lever being loosely connected with a bar 26. This bar bears a roll 27, that is held in engagement with the edge of a cam 28 on the main cam-shaft 30 by the tension of an ordinary spring, (not shown,) and the end of the bar is forked and fits upon a guiding-block 29 on the cam-shaft. When the rotation of the cam through the roll reciprocates the bar, the lever with which it is connected is oscillated and the slide reciprocated, so that the notch in the slide is moved back and forth from beneath the open bottom of the guideway to beneath the grasping-fingers. The end of this lever is adjustably connected with the end of this bar, in order that the movement of the slide may be properly regulated, Figs. 4 and 6.

The lower of the blanks in the grooved way drops into the notch in the slide and is carried into position to be picked up by the spring-fingers 31. These fingers are connected with a block 32, attached to a dovetailed part 33, that is fitted into and moves freely in the dovetailed guiding-groove in a part of the block 19. Between the spring-fingers is a rigid finger 34, with a recessed end, and the lower ends of the spring-fingers are bent, so as to grasp and hold a blank between them against the end of the rigid finger 34, Figs. 4 and 5.

The dovetailed part 33 is normally drawn down by means of a spring 35, so as to tend to keep the spring-fingers in their lowest position. The forked end of the rocker-arm 36 engages with a pin projecting from the dovetailed part 33, and connected with the shaft of this rocker-arm is another rocker-arm 37. The end of this latter rocker-arm is loosely connected with the end of a rod 38, that is connected at its other end with a lever 39, which bears a roll that engages the edge of a cam 40 on the main cam-shaft. The rod 38 is adjustably connected with the lever and rocker-arm, so that the amount of movement of the slide may be accurately determined. The rotation of the cam 40 oscillates the lever 39 in one direction and through the rod 38 oscillates the rocker-arms 36 and 37, and this causes the fingers to be raised vertically. When the fingers move downwardly under the influence of the spring 35, the spring-fingers snap onto a blank held by the notch of the slide, the spring-fingers passing each side of the blank-supporting projection 24. The cam 40 is so timed that the fingers move downwardly and grasp a blank, then move upwardly with a blank until the slide is withdrawn, and then they move farther downwardly in front of the pusher that advances and moves the blank from the fingers into the jaws of the carrier, after which the fingers are raised, so that the slide may bring forward another blank, Figs. 4, 5, and 6.

The pusher 41, that advances the blank from the grasp of the fingers to the jaws, is a short piece with a cup-shaped end borne by a part adjustably connected with the shaft 42, that is loosely held in bearings formed in a bracket 43, attached to a portion of the bed of the machine. Supported by a part connected with this same shaft 42 is the ejector-pin 44, Figs. 4 and 7.

Mounted upon the bracket 43 is an angle-lever 45. One end of this lever engages with a part of the shaft 42, and the other end is connected with a rod 46, that is jointed to an angle-lever 47, bearing a roll that is held by the tension of a common spring (not shown) in engagement with the edge of the cam 48 on the main cam-shaft. The rotation of this cam oscillates the lever 47, which through the rod 46 oscillates the lever 45, so as to reciprocate the shaft bearing the inserting-pusher and ejecting-pin. The cam is so timed that the pusher is moved forward to advance a blank held by the fingers into the jaws on the carrier at the proper time and also to so move that the ejecting-pin will force out any completed nipple from the jaws before a new blank is presented, Figs. 1, 4, and 7.

In the form of machine shown there are eight pairs of jaws for receiving and holding the blanks, and these jaws are arranged equal distances apart on the carrier disk or dial 49, which is mounted upon a shaft 50, that passes through a portion of the bed of the machine. Each of the jaws 51 is held in position by a screw 52 and is adjusted to its proper position by means of a screw-pin 53, that has one side for a portion of its length flattened off for the purpose of making that part of the pin wedge-shaped. Each of the jaws 54 is held by a pivot 55, on which it swings as moved by a small cam 56. Each of these jaw-closing cams is formed by flattening a portion of a pin that is loosely held in a perforation in the carrier and provided with a crank-arm 57, having a stud 58, that projects into a cam-groove 59 in the cam-disk 60. Each of these cams 56 engages a spring 61, attached to a jaw 54, which spring can be adjusted by a screw 62 so that the cam will close the jaw to just the right extent for tightly grasping a blank. When a cam 56 is turned so that its flattened surface will lie against a spring 61, the jaw 54, to which the spring is attached, will open; but when that cam at the proper time is turned against the spring the jaw is moved so as to close and tightly grasp a blank which has been placed in the recessed ends, Figs. 8, 11, and 12.

The cam-disk 60 is mounted upon a collar on the shaft 50, and connected with this disk is the end of a bar 63, that bears a roll which engages with a cam-groove in the disk 64 on the main cam-shaft 30. The end of the bar 63 is forked and fits upon a guiding-block 65 on the shaft 30. At the proper time the cam 64 reciprocates the bar and moves the cam 59, so that the stud projecting from the crank-arm of one of the jaw-locking cams is moved so as to unlock one of the jaws, allowing it to open for the ejection of a finished nipple and the reception of another blank. After the new blank has been received the cam-disk 60 is oscillated so as to cause the cam-groove 59 to rock the locking-cam and cause it to lock the jaws closed in such manner that they will tightly hold the blank until the carrier makes a complete revolution and this pair of jaws again returns to the same position, Figs. 8, 9, 10, 11, and 12.

The carrier-shaft 50 bears a disk 66, that is provided with driving-mortises 67 and index-notches 68. On a crank-arm 69 is a roll 70, and when this roll passes into one of the driving-mortises the disk is rotated one step. The crank-arm 69 is connected with a shaft 71, that is provided with a pinion 72, whereby it may be rotated, and a grooved collar 73, whereby it may be reciprocated, Fig. 15. Engaging with the groove in this collar is a block attached to a lever 74, that is pivoted to the bed and bears a roll which engages with a cam 75 on the main cam-shaft 30. The shaft 30 near the cam 75 bears a gear 76, and meshing with this gear is a pinion 77 on a shaft 78, which at one end bears a driving-pulley 79 and at the other end a hand-wheel 80. When this pulley is rotated, the pinions and gear revolve the crank-arm, and at the same time the cam 75 gives the shaft and crank-arm a longitudinal reciprocation. If the shaft is drawn in by the position of the cam 75, the crank-arm revolves without engaging a driving-mortise of the disk; but if the shaft is forced out by the cam 75 the roll on the crank-arm will engage with a driving-mortise and move the disk so as to advance the carrier, with the jaws, one step. The cam 75, that reciprocates the shaft 71, is so timed that every other revolution of the crank-arm moves the disk, Figs. 1, 3, 13, and 14.

Supported by a bracket 81, attached to a part of the bed, is a locking-bolt 82. The front end of this bolt is shaped and arranged to fit into the index-notches 68 in the periphery of the index-disk, and the bolt is normally forced forward by a spring-plunger 83. Projecting from the locking-bolt is a pin with a roll 84, that is engaged by a lever 85, which bears a roll in engagement with the periphery of a cam 86, mounted on the main cam-shaft 30. At the proper moment this cam 86 oscillates the lever 85 in such manner that the locking-bolt is drawn back from the index-notch in which it rests, so as to allow the index-disk and carrier to be rotated. The cam 86 is so timed that the bolt is not withdrawn from an index-notch until just as the crank-arm is ready to move the disk, and the bolt is allowed to enter a locking-notch just before the crank-arm passes from one of the driving-mortises of the index-disk. Thus the carrier is always locked in the correct position for the tools to properly operate upon the blanks, Figs. 13, 14, 15, and 16.

Mounted in a grooved way on the top of a part of the bed of the machine is a carriage 87. On a pin projecting from one side of this carriage is a roll 88. This roll is engaged by a cam 89 on the main cam-shaft 30, so that the rotation of that shaft and cam reciprocates the carriage along the top of the bed, Figs. 1, 17, and 18. The carriage has upwardly-projecting walls, and mounted in suitable adjustable bearings in these walls, so as to move with the carriage, are spindles 90, 91, and 92. The spindles are arranged on the arc of a circle the center of which is coincident with the axis of the carrier, and the axes of the spindles are in line with the center of the openings through the jaws on the carrier. Each of these spindles bears at one end a tool-holding chuck and at the other end a pinion that meshes with a gear 93. The upper spindle 90 has a chuck fitted with a point 94, arranged to turn a center in the ends of the blanks, and a turning-tool 95, arranged to turn a taper on the outside of the ends of the blanks. The spindles 91 and 92 bear chucks fitted with ordinary drills 96. The gear 93 is mounted on a shaft that is supported by the carriage and bears a driving-pulley 97. When this pulley is rotated through the gear and pinions, the spindles are rotated simultaneously as they move with the carriage back and forth, Figs. 1, 17, 18, 19, and 23.

Held by suitable bearings in the walls of the bed is a frame that supports a spindle 98. This spindle, that extends transversely of the machine, is shown as having a collar 99, with a sleeve 100, a driving-pulley 101, and two pairs of mills 102. These mills are mounted upon collars 103, and the pairs are held separated by a sleeve 104, that at one end is threaded and provided with an adjusting-nut 105 and clamping-nut 106. Outside of the mills at one end there is a securing-nut 107, Fig. 20. The mills are arranged so that their peripheries will revolve in planes ninety degrees apart on the arc of a circle the center of which is the axis of the blank-carrier, so that the blanks in traveling with the carrier will revolve ninety degrees in passing from one set of mills to the other. The securing means shown allows the distance between the mills to be accurately adjusted, so that the mills will slab off the sides of the blanks evenly, Figs. 1, 17, and 18.

The bracket 108 of the mill-frame is connected by an adjustable link 109 with the carriage, so that the reciprocation of the carriage will oscillate the frame and mills. The link is shown as formed of two end pieces 110, connected by a threaded stud 111, bearing a turning-hub 112, Fig. 22. The bracket 113 is formed in two parts, so that when the set-bolt 114 is loosened the upper part can be adjusted by the bolt 115, this movement permitting the distance between the mills to be varied. When the carriage is reciprocated and the centering, turning, and boring tools are carried forward, the mill-frame is oscillated, so that the mills travel forward to accomplish their work at the same time on those blanks which are presented in front of them by the intermittent rotary movement of the carrier, Figs. 1, 17, 18, 20, and 21.

Movably supported by suitable bearings in the walls of the carriage is a spindle 116. This spindle bears on its front end a chuck, with an ordinary tap 117, and near the middle of its length a pinion 118. Connected with the spindle is a lever 119, that is connected by a link 120 with a lever 121. The latter lever is borne by a shaft that extends transversely of the bed and on the rear side of the machine bears a rocker-arm 122, having a roll that is adapted to be engaged by a cam 123 on the periphery of the drum 124. This cam is so arranged that at the proper time the arm 122 is rocked and the levers oscillated in such manner as to start the tap forward into the hole in the blank which is to be threaded, Figs. 1, 23, and 24.

Meshing with the pinion 118 is a gear 125, that is mounted on a spindle 126, that has a reciprocation in bearings in the brackets 127, secured to the bed of the machine. Mounted on the spindle 126 are clutch-pulleys 128, that are belted so as to run freely in opposite directions. These clutch-pulleys are arranged to engage hubs projecting from opposite sides of the gear 125. The gear rotates according to the direction of rotation of the clutch-pulley that is in engagement with it. The spindle 126 is provided with a grooved collar 129, and engaging with this is the end of a T-shaped lever 130. The arm 131 of this lever is drawn forward by a spring 132, and the arm 133 is connected with a rod 134, that passes through a sleeve 135, that is loosely connected with the end of an angle-lever 136. A spring 137 is placed on the rod 134 between the sleeve 135 and the adjusting and clamping nuts 138, forming an elastic connection between the rod and sleeve, and nuts 139 are provided for adjusting the amount of downward movement of the rod through the sleeve connected with the end of the lever 136. The lower end of the lever 136 is adapted to engage a spring-latch 140, connected with the bed. Resting on this latch that holds the end of the lever 136 is a trip-lever 141, that by a rod 142 is connected with one end of the lever 121. The rod 142 bears an adjustable collar 143, that is adapted to engage and oscillate the trip-lever 141 at the proper time. Connected with the lever 136 is a rod 144. This rod extends through the walls of the bed transversely of the machine and on the rear side is connected with the lever 145, that bears a roll which is engaged by the edge of a cam 146 on the main cam-shaft 30, Figs. 23 and 24.

By means of one of the clutch-pulleys and the gear and pinion the tap-spindle is rotated in one direction. At the proper time the cam 123 oscillates the rocker-arm 122, and this causes the levers 121 and 119 to force the rotating tap-spindle forward, so that the tap feeds positively into the opening to start the threading. The cam 123 is short, so that it only feeds the tap in a short distance and then allows the tap to feed itself to complete the threading of the perforation. When the tap has advanced as far as necessary, the collar 143 engages and moves the trip-lever 141, so that it forces the spring-latch 140 from engagement with the end of the lever 136, leaving the lever free to move. When this lever is free, the spring 132 oscillates the lever 130 in such manner that the spindle 126 is reciprocated and one clutch-pulley disengaged from a hub of the gear 125 and the other clutch-pulley engaged with the other hub of the gear 125. This causes the gear and of course the pinion and tap-spindle to be rotated in a reverse direction, and when rotating in this direction the tap turns itself out of the thread cut during its forward movement. At the correct time after the tap has been withdrawn from the thread it has cut the cam 146 oscillates the lever 145, which reciprocates the rod 144 and draws back the lever 136 against the pull of the spring 132 until this lever 136 is again engaged and held by the spring-latch 140. This movement of the lever 136 draws down the arm 133 of the lever 130, putting the spring 132 under tension and at the same time reversing the grasp of the clutch-pulleys upon the hub of the gear, so that the tap will rotate forward. By means of this arrangement of cams and levers the tap is first started forward with a positive feed and then allowed to feed itself until the threading is completed, after which the rotation of the tap is reversed, so that it will turn itself out of the thread it cut. The tap thus feeds forward and backward, rotating first in one direction and then the other continuously. The clutch-pulleys are caused to engage with the hubs of the gear without jamming by connections which are adjustable and which are somewhat elastic, so that they may be nicely adjusted and will always operate without either damaging the tap or the work which the tap has accomplished in the blank. The adjustment of these parts also allows the accurate determination of the forward-and-backward movement of the tap, so that smooth even work can be readily accomplished with the desired effort, Figs. 23, 24, and 25.

In this machine the headed blanks are thrown promiscuously into the hopper and by the elevator are lifted a few at a time and allowed to slide down the trough and rest upon the slide at the bottom of the grooved way. The lower of the blanks rests in the notch in the slide, so that as the slide is moved this blank is carried beneath the fingers. The bottom of the way is closed by the slide as it is moved until the notch is again returned for receiving the next blank. The fingers descend and grasp and then pick up the blank held in the slot until the slide is withdrawn, and then the fingers farther descend and present the blank in front of a pair of the jaws on the carrier or dial-plate. The pusher advances and thrusts the blank between the jaws, the fingers being lifted out of the way, and then the jaws are closed by the short oscillation of the jaw-locking cam. The blank gripped by the jaws is carried with the carrier or dial-plate a complete revolution. The index-disk is unlocked and given an intermittent rotary movement and then locked eight times to accomplish this single revolution. As shown, there are eight driving-mortises in the index-disk. Therefore there are eight dwells for the carrier and blanks in making one revolution. As the crank-arm is reciprocated in and out the crank only engages with and moves the index-disk a step every other revolution of the crank-arm. This gives the blanks a longer dwell for the operation of the tools than they would have if the crank moved the index-disk at each revolution of the cam-shaft. The first movement of the carrier presents a blank in front of the upper tools which turn a centering-recess and taper off the outside of the ends. The next movement of the carrier presents the blank in front of the drill that bores the partial perforation. The next movement presents the blank in front of the drill that completes the perforation. The next movement presents the blank to the first set of slabbing-mills. No tool operates upon the blank after the next movement. The next movement presents the blank in front of the other set of slabbing-mills, and as the carrier has made a quarter of a revolution in passing from one set of mills to the other the blank is squared by the mills. The next movement presents the blank to the tap. The next movement completes the revolution and presents the blank in front of the ejector, which when the jaws are opened moves up and ejects the finished nipple. Of course after each movement of the carrier a new blank is inserted in the open jaws from which a finished nipple has been ejected, so that all of the operations are being performed simultaneously upon the successive blanks without intermission.

This machine is comparatively simple in construction, the operations are performed rapidly and accurately, and the blanks are continuously and without attendance transformed into finished nipples ready for use. The various mechanisms are capable of adjustment, so that different forms of nipples can be produced by this machine.

I claim as my invention—

1. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, drilling, tapping and milling tools movable simultaneously toward and from the carrier for operating upon the blanks, an ejector movable on the tool side of the carrier independently of the tools for discharging the finished nipples from the jaws of the carrier, and mechanisms for moving the ejector, substantially as specified.

2. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, means for opening and closing the jaws of the carrier, drilling, tapping and milling tools movable simultaneously toward and from the carrier for operating upon the blanks, an ejector movable on the tool side of the carrier independently of the tools for discharging the finished nipples from the jaws of the carrier, and mechanisms for moving the ejector, substantially as specified.

3. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a pusher for advancing the blanks from the feed mechanisms into the jaws of the carrier, tools movable toward and from the carrier for operating upon the blanks, and an ejector connected with the pusher for discharging the finished nipples from the jaws of the carrier, substantially as specified.

4. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a pusher for advancing the blanks from the feed mechanisms into the jaws of the carrier, tools movable independently of the pusher toward and from the carrier for operating upon the blanks, and an ejector connected with the pusher for discharging the finished nipples from the jaws of the carrier, substantially as specified.

5. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, boring and milling tools movable together toward and from the carrier for operating upon the blanks, a threading-tool movable independently of the boring and milling tools toward and from the carrier for threading the blanks, and an ejector for discharging the finished nipples from the jaws of the carrier, substantially as specified.

6. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a carriage movable toward and from the carrier, turning and boring tools supported by and movable with the carriage, and mills supported by the bed independently of the carriage and movable simultaneously with the turning and boring tools, substantially as specified.

7. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a carriage movable toward and from the carrier, turning and boring tools supported by and movable with the carriage, mills supported by the bed independently of the carriage, and a connection between the mill-supporting frame and the carriage, substantially as specified.

8. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a carriage movable toward and from the carrier, turning and boring tools supported by and movable with the carriage, and mills supported by a frame that is pivotally connected with the bed, substantially as specified.

9. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a carriage movable toward and from the carrier, turning and boring tools supported by and movable with the carriage, and a tap supported by but movable independently of the carriage, substantially as specified.

10. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a carriage movable toward and from the carrier, turning and boring tools supported by and movable longitudinally together with the carriage, a tap supported by but movable independently of the carriage, and mills supported independently of but movable with the carriage, substantially as specified.

11. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a carriage movable toward and from the carrier, turning and boring tools supported by and movable longitudinally together with the carriage, a tap supported by but movable independently of the carriage, mills supported independently of but movable with the carriage, and an ejector supported by the bed and movable independently of the carriage, substantially as specified.

12. In a machine for forming nipples, in combination, a receptacle for receiving the blanks, a carrier with holding-jaws for grasping the blanks rotarily mounted upon the bed, feed mechanisms for transferring the blanks from the receptacle to the jaws of the carrier, a carriage movable toward and from the carrier, turning and boring tools supported by and movable with the carriage, a tap supported by but movable independently of the carriage, mills borne by a frame pivotally connected with the bed in advance of the carriage, and a link connecting the mill-frame with the carriage, substantially as specified.

13. In a machine for forming nipples, in combination, a receptacle for receiving the blanks, an elevator for lifting the blanks from the receptacle, a trough for receiving the blanks from the elevator, a slide for carrying the blanks from the trough, reciprocating fingers for removing the blanks from the slide, a carrier with holding-jaws for grasping the blanks rotarily mounted upon the bed, a pusher for advancing the blanks from the fingers into the jaws of the carrier, cutting and tapping tools movable toward and from the carrier, and a movable ejector for discharging the finished nipples from the jaws of the carrier, substantially as specified.

14. In a machine for forming nipples, in combination, a receptacle for receiving the blanks, an elevator for lifting the blanks from the receptacle, a trough for receiving the blanks from the elevator, a slide for carrying the blanks from the trough, reciprocating fingers for moving the blanks from the slide, a carrier with holding-jaws for grasping the blanks rotarily mounted upon the bed, a pusher for advancing the blanks from the fingers into the jaws of the carrier, means for intermittently rotating the carrier, mechanisms for opening and closing the jaws, cutting and tapping tools movable toward and from the carrier, and a movable ejector for discharging the finished nipples from the jaws of the carrier, substantially as specified.

15. In a machine for forming nipples, in combination, a receptacle for receiving the blanks, an elevator for lifting the blanks from the receptacle, a trough for receiving the blanks from the elevator, a slide for carrying the blanks from the trough, reciprocating fingers for removing the blanks from the slide, a carrier with holding-jaws for grasping the blanks rotarily mounted upon the bed, a pusher for advancing the blanks from the fingers into the jaws of the carrier, means for intermittently rotating the carrier, mechanisms for opening and closing the jaws, a carriage movable toward and from the carrier, turning and boring tools mounted on the carriage and movable simultaneously with the carriage toward and from the carrier, and a movable ejector on the tool side of the carriage for discharging the finished nipples from the jaws of the carrier, substantially as specified.

16. In a machine for forming nipples, in combination, a receptacle for receiving the blanks, an elevator for lifting the blanks from the receptacle, a trough for receiving the blanks from the elevator, a slide for carrying the blanks from the trough, fingers for removing the blanks from the slide, a carrier with holding-jaws for grasping the blanks rotarily mounted upon the bed, a pusher for advancing the blanks from the fingers into the jaws of the carrier, means for intermittently rotating the carrier, mechanisms for opening and closing the jaws, a carriage movable toward and from the carrier, turning and boring tools mounted on the carriage and movable simultaneously toward and from the carrier, mills supported by the bed independently of the carriage but connected so as to move therewith, and an ejector for discharging the finished nipples from the jaws of the carrier, substantially as specified.

17. In a machine for forming nipples, in combination, a receptacle for receiving the blanks, an elevator for lifting the blanks from the receptacle, a trough for receiving the blanks from the elevator, a slide for carrying the blanks from the trough, fingers for removing the blanks from the slide, a carrier with holding-jaws for grasping the blanks rotarily mounted upon the bed, a pusher for advancing the blanks from the fingers into the jaws of the carrier, means for intermittently rotating the carrier, mechanisms for opening and closing the jaws, a carriage movable toward and from the carrier, turning and boring tools mounted on the carriage and movable simultaneously toward and from the carrier, a tap supported by the carriage and movable independently thereof, and an ejector for discharging the finished nipples from the jaws of the carrier, substantially as specified.

18. In a machine for forming nipples, in combination, a receptacle for receiving the blanks, an elevator for lifting the blanks from the receptacle, a trough for receiving the blanks from the elevator, a slide for carrying the blanks from the trough, fingers for removing the blanks from the slide, a carrier with holding-jaws for grasping the blanks rotarily mounted upon the bed, a pusher for advancing the blanks from the fingers into the jaws of the carrier, means for intermittently rotating the carrier, mechanism for opening and closing the jaws, a carriage movable toward and from the carrier, turning and boring tools mounted on the carriage and movable simultaneously toward and from the carrier, mills supported by the bed independently of the carriage but connected so as to move therewith, a tap supported by the carriage but moving independently thereof, and an ejector for discharging the finished nipples from the jaws of the carrier, supported by the bed and movable independently of the carriage, substantially as specified.

19. In combination with the feeding mechanisms and cutting-tools of a machine of the within-described class, a rotary carrier, pairs of jaws borne by the carrier, one of each of said pairs of jaws having a spring-shank, a cam-stud for closing one of the jaws of each pair, a crank for operating this cam-stud, an oscillating cam for rocking the crank, a bar for oscillating the crank-moving cam, and a rotary cam for reciprocating the bar, substantially as specified.

20. In combination with the feeding mechanisms and cutting-tools of a machine of the within-described class, a carrier, pairs of jaws pivoted to the carrier, a cam-stud for adjusting one of each of the pairs of jaws, a cam-stud for closing the other of each of the pairs of jaws, a crank for operating one cam-stud of each pair, an oscillating cam for rocking the crank, a bar for oscillating the crank-moving cam, and a rotary cam for reciprocating the bar, substantially as specified.

21. In combination with the feeding mechanisms and cutting-tools of a machine of the within-described class, a carrier, pairs of jaws borne by the carrier, one of the jaws of each pair having a spring-shank and an adjusting-screw to regulate the spring of the shank, a cam-stud bearing against the spring-shank of one of each of the pairs of jaws, a crank for operating each cam-stud, an oscillating cam for rocking the cranks, a bar for oscillating the crank-moving cam, and a rotary cam for reciprocating the bar, substantially as specified.

22. In combination with the feeding mechanisms and cutting-tools of a machine of the within-described class, a carrier, pairs of jaws pivoted to the carrier, one of the jaws of each pair having a spring-shank and an adjusting-screw for regulating the spring of the shank, a cam-stud bearing against the spring-shank of one of each of the pairs of jaws, a crank for operating each of the cam-studs, an oscillating cam for rocking the cranks, a bar for oscillating the crank-moving cam, a rotary cam for reciprocating the bar, and a wedge-stud for adjusting the other of each of the pairs of jaws, substantially as specified.

23. In combination with the feeding mechanisms and cutting-tools of a machine of the within-described class, a carrier bearing adjustable jaws, mechanisms for adjusting and for opening and closing the jaws, an index-disk connected with the carrier, a crank for rotating the index-disk, said crank being borne upon a reciprocating shaft, means for rotating the crank-shaft, and mechanisms for reciprocating the crank-shaft, substantially as specified.

24. In combination with the feeding mechanisms and cutting-tools of a machine of the within-described class, a carrier bearing adjustable jaws, mechanisms for opening and closing the jaws, an index-disk connected with the carrier, said disk having driving-mortises and peripheral locking-notches, a crank adapted to engage the driving-mortises, means for rotating the crank, a bolt adapted to engage the locking-notches, and mechanism for reciprocating the bolt radially of the disk and withdrawing it from the notches at the proper time, substantially as specified.

25. In combination with the feeding mechanisms and cutting-tools of a machine of the within-described class, a rotary carrier bearing jaws, mechanisms for opening and closing the jaws, an index-disk connected with the carrier, said disk having driving-mortises and locking-notches, a crank adapted to engage with the driving-mortises, said crank being borne upon a reciprocating shaft, means for rotating and mechanisms for reciprocating the crank-shaft, a bolt adapted to engage the locking-notches of the index-disk, and mechanisms for withdrawing the bolt from the notches at the proper time, substantially as specified.

26. In combination with the feeding mechanisms and cutting-tools of a machine of the within-described class, a carrier bearing jaws, mechanisms for opening and closing the jaws, an index-disk connected with the carrier, said disk having driving-mortises and locking-notches, a crank adapted to engage with the driving-mortises, said crank being borne upon a reciprocating shaft, means for rotating and mechanisms for reciprocating the crank-shaft, a spring-bolt adapted to engage the locking-notches of the index-disk, a lever adapted to engage the spring-bolt, and a cam for moving the lever at the proper time, substantially as specified.

27. In combination with the feeding mechanisms, the carrier and the cutting-tools of a machine of the within-described class, a pusher for advancing the blanks to the carrier, an ejector for discharging the finished nipples from the carrier, said pusher and ejector being mounted with their axes in the same line and connected so as to move together and operate upon opposite sides of the same set of jaws, levers for reciprocating the pusher and ejector, and a cam for oscillating the levers, substantially as specified.

28. In combination with the feeding mechanisms, the carrier and cutting-tools of a machine of the within-described class, a pusher for advancing the blanks to the carrier, an ejector for discharging the finished nipples from the carrier, said pusher and ejector being mounted upon the same spindle, levers for reciprocating the spindle, and a cam for oscillating the levers, substantially as specified.

29. In combination with the feeding mechanisms, the carrier and the cutting-tools of a machine of the within-described class, a frame mounted upon the bed so that it may be oscillated, mechanisms for oscillating the frame, a spindle supported by the frame, two pairs of mills adjustably supported by the spindle, and means for rotating the spindle, substantially as specified.

30. In combination with the feeding mechanisms, the carrier and the boring-tools of a machine of the within-described class, a frame mounted upon the bed so that it may be oscillated, one of the brackets of said frame being adjustable, a spindle supported by the frame, two pairs of mills adjustably supported by the spindle, and means for rotating the spindle, substantially as specified.

31. In combination with the feeding mechanisms, the carrier and the cutting-tools of a machine of the within-described class, a threading mechanism consisting of a movable spindle bearing a tap and a pinion, means for reciprocating the spindle, a gear mounted upon a movable shaft and meshing with the tap-spindle pinion, clutch-pulleys mounted upon the gear-shaft, and means for reciprocating the gear-shaft so as to connect one and disconnect the other of the clutch-pulleys with the gear to reverse the direction of rotation of the gear and tap-spindle, substantially as specified.

32. In combination with the feeding mechanisms, the carrier and the cutting-tools of a machine of the within-described class, a threading mechanism consisting of a spindle bearing a tap and pinion, a gear mounted upon a shaft and meshing with the tap-spindle pinion, pulleys mounted upon the gear-shaft, levers for shifting clutches so as to connect one and disconnect the other with the gear, springs for throwing the levers, a catch for holding the levers with the springs under tension, and a trip mechanism for releasing the catch at the proper time, substantially as specified.

33. In combination with the feed mechanisms, the carrier and the cutting-tools of a machine of the within-described class, a threading mechanism consisting of a spindle bearing a tap and a pinion, levers for advancing the tap-spindle, a cam for moving the levers, a gear mounted upon a shaft and meshing with the tap-spindle pinion, pulleys mounted upon the gear-shaft, levers for shifting clutches so as to connect one and disconnect the other of the pulleys with the gear, springs for throwing the levers, a catch for holding the levers with the springs under tension, and a trip mechanism for releasing the catch, substantially as specified.

34. In combination with the feeding mechanisms, the carrier and the cutting-tools of a machine of the within-described class, a threading mechanism consisting of a spindle bearing a tap and a pinion, levers for advancing the tap and spindle, a cam for moving the levers, a gear mounted upon a shaft and meshing with the tap-spindle pinion, pulleys mounted upon the gear-shaft, levers for shifting clutches so as to connect one and disconnect the other of the pulleys with the gear, springs for throwing the levers in one direction, a catch for holding the levers with the springs under tension, levers and cams for drawing the clutch-levers and placing the springs under tension and setting the catch, and a connection between the tap-spindle levers and the latch for releasing the catch, substantially as specified.

35. In combination with the feeding mechanisms and cutting-tools of a machine of the within-described class, a carrier bearing jaws, an index-disk connected with the carrier, a crank for rotating the index-disk, said crank being borne upon a reciprocating-shaft, means for rotating the crank-shaft, and mechanism for reciprocating the crank-shaft, substantially as specified.

36. In combination in a machine of the within-described class, a gravity feed-trough, a movable slide at the bottom of the feed-trough for receiving the blanks, mechanism for moving the slide with a blank from the bottom of the trough to a position in line with the grasping-fingers, reciprocating grasping-fingers for picking up the blank from the slide, mechanisms for reciprocating the fingers, a rotary disk with jaws for receiving the blank arranged around the face of the disk, mechanisms for opening and closing the jaws, and reciprocating pushers for alternately thrusting a blank into and forcing a nipple out of the pairs of jaws, substantially as specified.

37. In combination with a carrier for receiving pieces to be operated upon and the tools for operating upon the pieces, a hopper, a feed-trough leading from the hopper to the carrier, an elevator-plate movably held by the walls of the hopper, a stop for limiting the upward movement of the elevator-plate, mechanism for reciprocating the elevator-plate, and an adjustable elastic connection between the elevator-plate and the mechanism for moving the elevator-plate, substantially as specified.

38. In combination with a carrier for receiving pieces to be operated upon and the tools for operating upon the pieces, a hopper, a feed-trough leading from the hopper to the carrier, an elevator-plate movably held by the walls of the hopper, a stop for limiting the upward movement of the elevator-plate, mechanism for reciprocating the elevator-plate, and an elastic connection between the elevator-plate and the mechanism for moving the elevator-plate, substantially as specified.

ANDREW C. CAMPBELL.

Witnesses:
H. R. WILLIAMS,
G. R. LEGGETT.